March 17, 1936.  O. V. MARTIN  2,034,681
RECOVERY OF SALTS AND OTHER PRODUCTS FROM OIL FIELD BRINES
Filed April 6, 1932  2 Sheets-Sheet 1
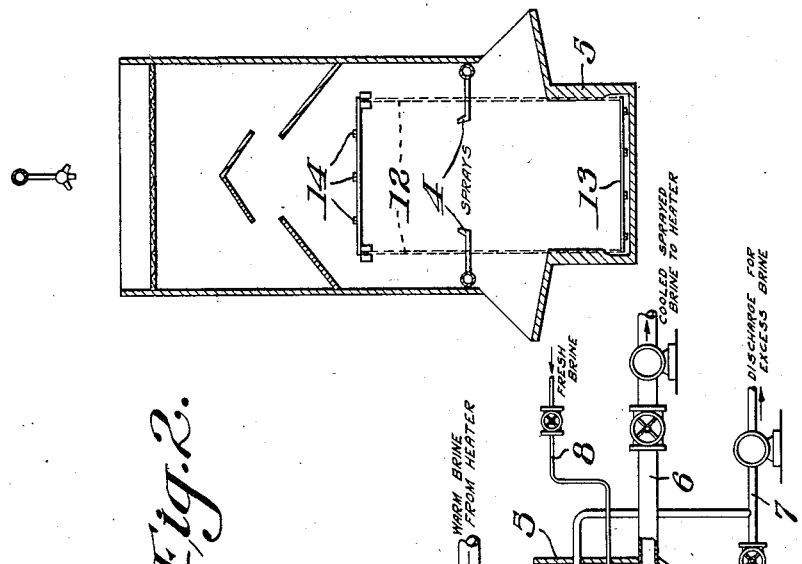
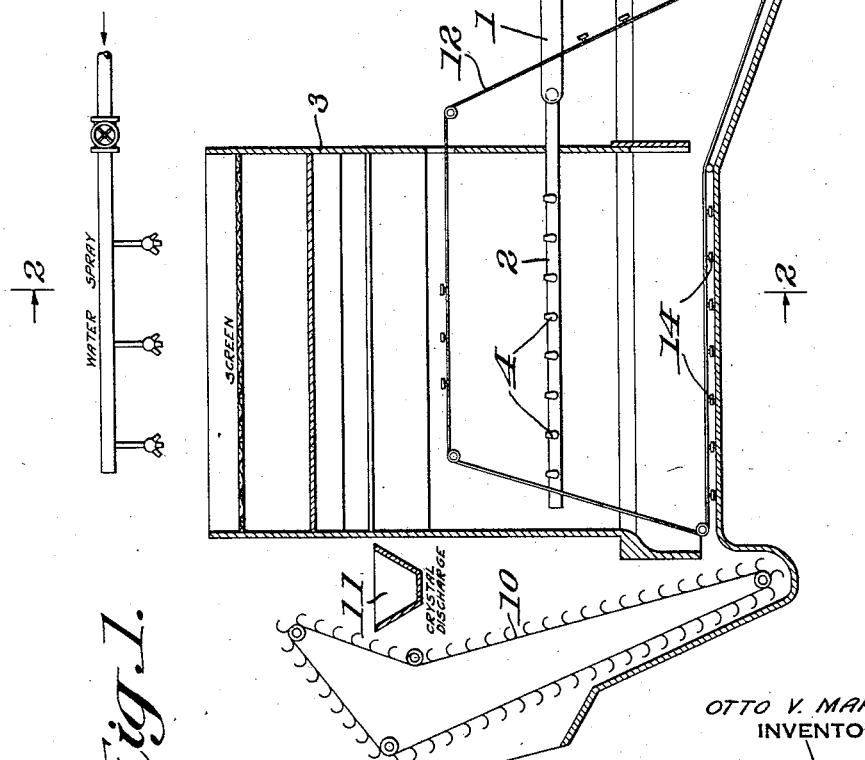
OTTO V. MARTIN
INVENTOR
BY R. J. Dearborn
HIS ATTORNEY March 17, 1936. O. V. MARTIN 2,034,681
RECOVERY OF SALTS AND OTHER PRODUCTS FROM OIL FIELD BRINES
Filed April 6, 1932 2 Sheets-Sheet 2
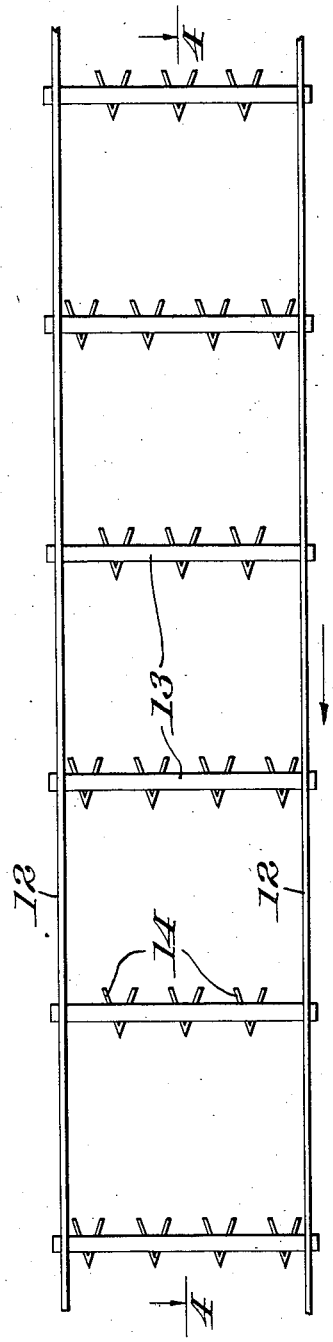
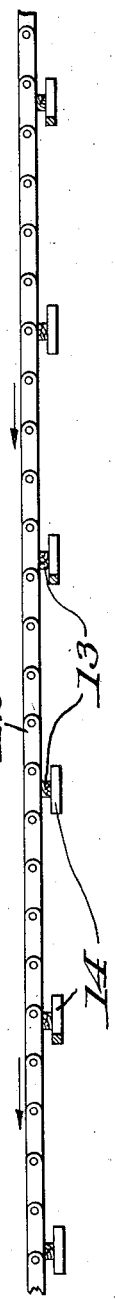
OTTO V. MARTIN
INVENTOR
BY R. J. Dearborn
HIS ATTORNEY Patented Mar. 17, 1936

2,034,681

UNITED STATES PATENT OFFICE 2,034,681

RECOVERY OF SALTS AND OTHER PRODUCTS FROM OIL FIELD BRINES

Otto V. Martin, Tulsa, Okla., assignor to Texaco Salt Products Company, Tulsa, Okla., a corporation of Delaware Application April 6, 1932, Serial No. 603,516

3 Claims. (Cl. 23—273)

This invention relates to the treatment of oil field brine or salt solutions for the recovery of salts or other products therefrom.

The invention contemplates a method of and apparatus for recovering salt from solutions containing the salt comprising circulating the solution through a heat absorption and evaporation system forming supersaturated solution, maintaining the solution in a flowing body from which the salt is precipitated, moving a mass of the precipitated salt particles through the solution while subjecting the particle mass to tumbling and prolonged contact with supersaturated solution to thereby produce salt of uniformly large particle size. This application is a continuation-in-part of my co-pending application, Serial 475,270, filed August 14, 1930, for Recovery of salts and other products from oil field brines now Pat. No. 1,900,246, Mar. 7, 1933.

In my co-pending application, above referred to, I have described a spray pond surmounted by an enclosure or chamber wherein warm brine is evaporated by exposure to the atmosphere in the form of a fine spray. The spray concentrated brine collects in the bottom of the tank through which it flows to a sump at the discharge end of the tank, from which point it is withdrawn, and, together with fresh brine, passed through suitable heating means and returned to the sprays. The salt particles precipitating from the sprayed liquid settle to the floor of the tank and are moved slowly thereover by a drag moving countercurrently to the flowing brine. The particles of salt are deposited at the discharge end of the tank from which point they are withdrawn.

The growth of salt crystals is largely dependent upon the degree of contact maintained between supersaturated liquid and precipitating salt particles; that is, where a concentrated solution from which particles of salt are precipitating, remains in a substantially undisturbed condition there may be a preponderance of fine particles or crystals precipitated and their rate of growth is relatively slow. This is due to the fact that a condition of equilibrium tends to prevail wherein that portion of the solution immediately adjacent to the precipitated material is in a state of less than supersaturation since salt has, of course, already been precipitated therefrom. Since this portion of the liquid body is in a substantially quiescent condition, it prevents relatively more saturated portions or strata of the liquid body from making direct or intimate contact with the precipitated particles which latter might otherwise readily serve as nuclei about which additional salt could be precipitated. As a result, the final product may comprise a preponderant proportion of undesired fine crystalline material.

Moreover, the particle mass, as it moves over the floor of the tank, tends to carry along with it the relatively fine particles of salt deposited upon it which ultimately become confined within the interior of the mass as it grows in depth. Unless these fine particles are continually swept out of the mass and maintained suspended in the mother liquor, they remain in the mass and are removed from the system while remaining in a fine state.

My invention comprises maintaining the solution from which the salt is precipitated in a flowing body, preferably a relatively shallow body. The mass of precipitated salt particles is slowly moved countercurrently through this solution while being subjected to continual tumbling and stirring. By subjecting the particles to this tumbling motion, preferably while being moved over the floor of the tank in a zigzag fashion, the mass is thus maintained in a loose disrupted condition as a result of which the relatively fine constituents are displaced from the mass and become suspended in the flowing liquid. In this way, they are retained in the system and subjected to prolonged and continued contact with the solution until they attain such a degree of growth that they then remain deposited in the main body of solids.

In order to more clearly understand the invention, reference will now be made to the figures of the accompanying drawings illustrating a flow diagram together with a preferred embodiment of apparatus particularly well adapted to carrying out my improved process and forming a part of the invention, in which:

Fig. 1 is an elevational view of a longitudinal section of a spray pond or chamber, Fig. 2 is a sectional view of the spray chamber taken along the line 2—2 of Fig. 1, Fig. 3 and 4 illustrate means for propelling the mass of the precipitated salt over the floor of the spray chamber while subjecting the mass to a continual tumbling action.

In general, the arrangement and operation of the spray chamber is similar to that described in detail in my co-pending application, above referred to.

Referring to Figs. 1 and 2, brine heated to a temperature usually substantially lower than its normal boiling temperature is conducted through a pipe 1 to a spray manifold 2 within the spray chamber 3 wherein it is exposed to the atmosphere in the form of a fine spray by means of spray nozzles 4. The sprayed liquid falls to the bottom of the tank 5, forming the bottom portion of the spray chamber, to collect therein with a body of fluid solution maintained therein and from which particles of salt are precipitated.

The sprayed solution collecting in the depressed part of the tank 5 is drawn off through a pipe 6 and conducted to heating means, not shown, and from which it is returned, in a heated condition, through the pipe 1.

The excess mother liquor collecting in the tank is drawn off through pipe 7 while fresh brine may be added to the system through a pipe 8 from a well or storage tank, not shown.

A continuous drag 9 is provided to move the mass of growing salt crystals slowly over the floor of the tank from the depressed portion or sump towards the crystal discharge end of the tank. From this point the crystals are picked up by conveyor 10 and conducted to a discharge chute 11 for further refining or other treatment.

As shown in Figs. 3 and 4, the drag advantageously comprises two chains or link belts 12 with cross-pieces 13 formed from either wood or steel, preferably the latter, secured thereto and spaced at short intervals. V-shaped scrapers or plows 14, preferably formed from some metallic material, are secured to the underside of each cross piece and may provide means for supporting the drag as it passes over the floor of the tank.

The positions of the scrapers on each cross piece are offset with respect to those of the scrapers on an adjacent cross piece. While not shown in the drawings, the sides of the scrapers may be curved to conform more nearly to the shape of a plow and thus further facilitate imparting a rolling or tumbling movement to the solid material through which or against which the scrapers are moving.

Thus, as the drag moves forward, the salt particles are subjected to a plowing action wherein portions of the mass are moved forward and laterally in one direction during contact with the scrapers of a particular cross piece, and then during contact with the following set of scrapers are subjected to further forward motion with lateral movement or rolling in the reverse direction.

The solution flowing through the tank will, for the most part, depending of course upon its depth, flow in a plurality of streams through the serpentine-like channels formed through the salt bed by the moving scrapers. In this way, close and intimate contact between the precipitated salt and the solution may be effected while maintaining a minimum volume of solution in the tank. Also by increasing the path of travel of the salt mass due to the zigzag movement over the floor of the tank, the mass remains in the tank for a much greater length of time than would be the case with the ordinary type of drag.

Furthermore by confining the solution in a number of flowing streams, greater turbulence and mixing results, so that intimate contact between the freshly sprayed super-saturated solution and the salt particles is effected.

While the invention is particularly well adapted to the recovery of ordinary salt from brines or solutions, it is equally adaptable to the preparation of other compounds or materials which are being precipitated from solutions containing them.

Obviously many modifications and variations of the invention, as hereinbefore set forth, may be made without departing from the spirit and scope thereof, and therefore only such limitations should be imposed as are indicated in the appended claims.

I claim:

1. In an apparatus for the recovery of salts from solutions, a precipitation tank, means for introducing brine into said tank and for flowing said brine through the same in a shallow body, scrapers for advancing precipitated salt through said tank, countercurrently to the direction of brine flow, said scrapers being formed as a succession of plows placed in staggered relation to move the precipitated salt forwardly and laterally alternately in opposite directions for subjecting the salt to a lateral tumbling action as the same is advanced through the tank.

2. In an apparatus for the recovery of salts from solutions, a precipitation tank, means for introducing brine into said tank and for flowing said brine through the same in a shallow body, means for mechanically advancing precipitated salt through said tank, countercurrently with respect to said brine flow, said means comprising a series of movable elements provided with plow-shaped scrapers moving said precipitated salt laterally as the same is advanced through said tank, the scrapers on successive members of the series being placed in staggered relation and spaced apart a distance not substantially greater than the effective width of said scrapers.

3. In an apparatus for the recovery of salts from solutions, a precipitation tank, means for introducing brine into said tank and for flowing said brine through the same in a shallow body, means for mechanically advancing precipitated salt through said tank, countercurrently with respect to said brine flow, said means comprising a series of movable elements provided with V-shaped scrapers movable along the floor of said tank, the scrapers on successive elements being offset so that on the passage of a plurality of said elements past a mass of precipitated salt said mass is moved laterally back and forth as it is advanced through said tank.

OTTO V. MARTIN.